Figure 1:
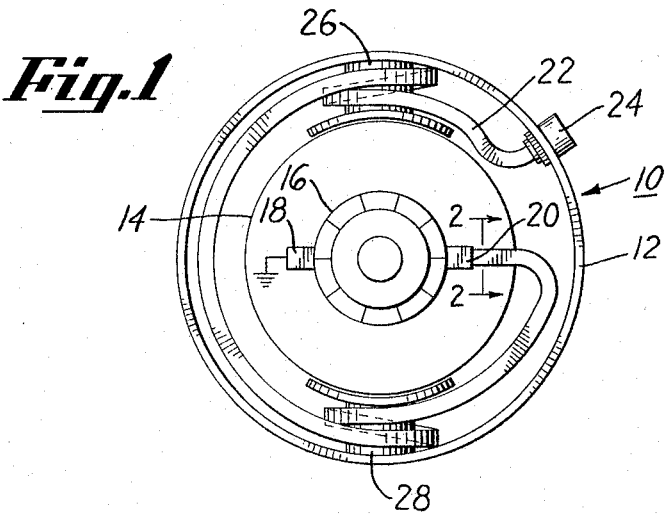

Nov. 29, 1966 B. H. SHORT 3,289,063
TRANSISTOR MOTOR CONTROL
Filed Jan. 26, 1962 2 Sheets-Sheet 1

INVENTOR.
BROOKS H. SHORT
BY C. R. Meland
HIS ATTORNEY

INVENTOR.
BROOKS H. SHORT
BY C.R. Meland
HIS ATTORNEY

United States Patent Office
3,289,063
Patented Nov. 29, 1966

1

3,289,063
TRANSISTOR MOTOR CONTROL
Brooks H. Short, Anderson, Ind., assignor to General Motors Corporation, Detroit, Mich., a corporation of Delaware
Filed Jan. 26, 1962, Ser. No. 169,054
10 Claims. (Cl. 318—252)

This invention relates to an electrical system for supplying current to an electrical load such as the field of a series motor through parallel connected transistors.

In high current transistor controlled electrical systems, it frequently becomes necessary to parallel several transistors in order to handle the current. Since the operating characteristics of the transistors are generally not the same, the transistors frequently do not equally share the load with the result that one or more of them may be destroyed. When a resistor is connected in series with each transistor, the transistors tend to share the load equally but there is a power loss in the resistors.

The present invention is concerned with the supplying of current to a load, which may be an inductive load, through parallel connected transistors which brings about the problem of equal load division among the transistors. This problem can be solved by connecting a resistor in series with each transistor with the resultant power loss, but in a system proposed by this invention, the resistance of the load is used to provide equal load division between the transistors. This is accomplished by dividing the total load, which may be an inductive load, into segments which are connected respectively in series with a respective transistor. It accordingly is one object of this invention to provide an electrical system wherein parallel connected transistors control current flow through a load and wherein the load is divided into a plurality of segments connected respectively in series with each transistor to provide equal division of the load between the transistors.

A more specific object of this invention is to provide a motor control system for a series motor wherei nparallel connected transistors control current flow through the field of the series motor and wherein the field winding is divided into smaller segments which are connected respectively in series with the transistors. With this arrangement, one segment of the field winding is connected in series with one of the transistors and an equal division of load is thus achieved without inserting extra resistance in series with each transistor.

Another object of this invention is to provide a motor control system for a series motor wherein the field winding of the series motor is broken up into small elements connected respectively in series with a respective transistor and wherein an infinitely variable voltage source controls the conductivity of the transistors. The infinitely variable voltage source is preferably a square wave generator and includes means for varying the width of the square waves so as to control the on and off time of the transistors.

A further object of this invention is to provide a series motor that has a field winding comprised of a plurality of parallel connected windings.

Further objects and advantages of the present invention will be apparent from the following description, reference being had to the accompanying drawings wherein preferred embodiments of the present invention are clearly shown.

Figure 2:
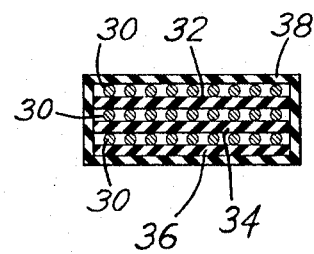

In the drawing:
FIGURE 1 is a schematic illustration of a series motor made in accordance with this invention.
FIGURE 2 is an enlarged sectional view taken along line 2—2 of FIGURE 1 and illustrating the plurality of conductors that make up the field winding of the motor of FIGURE 1.

2

Figure 4:
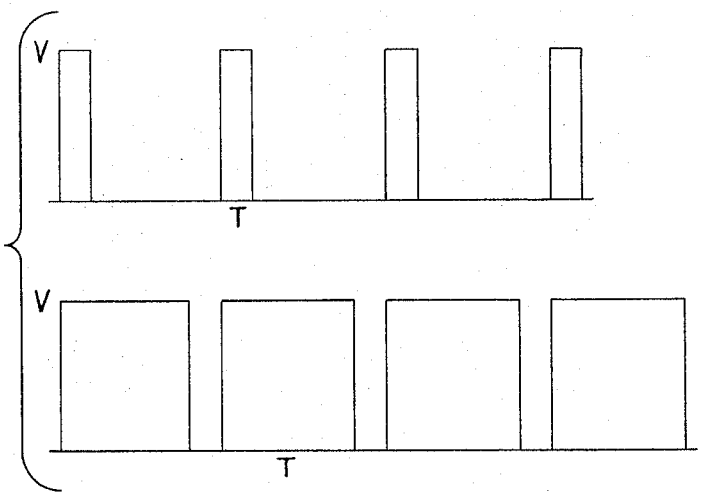
Figure 3:
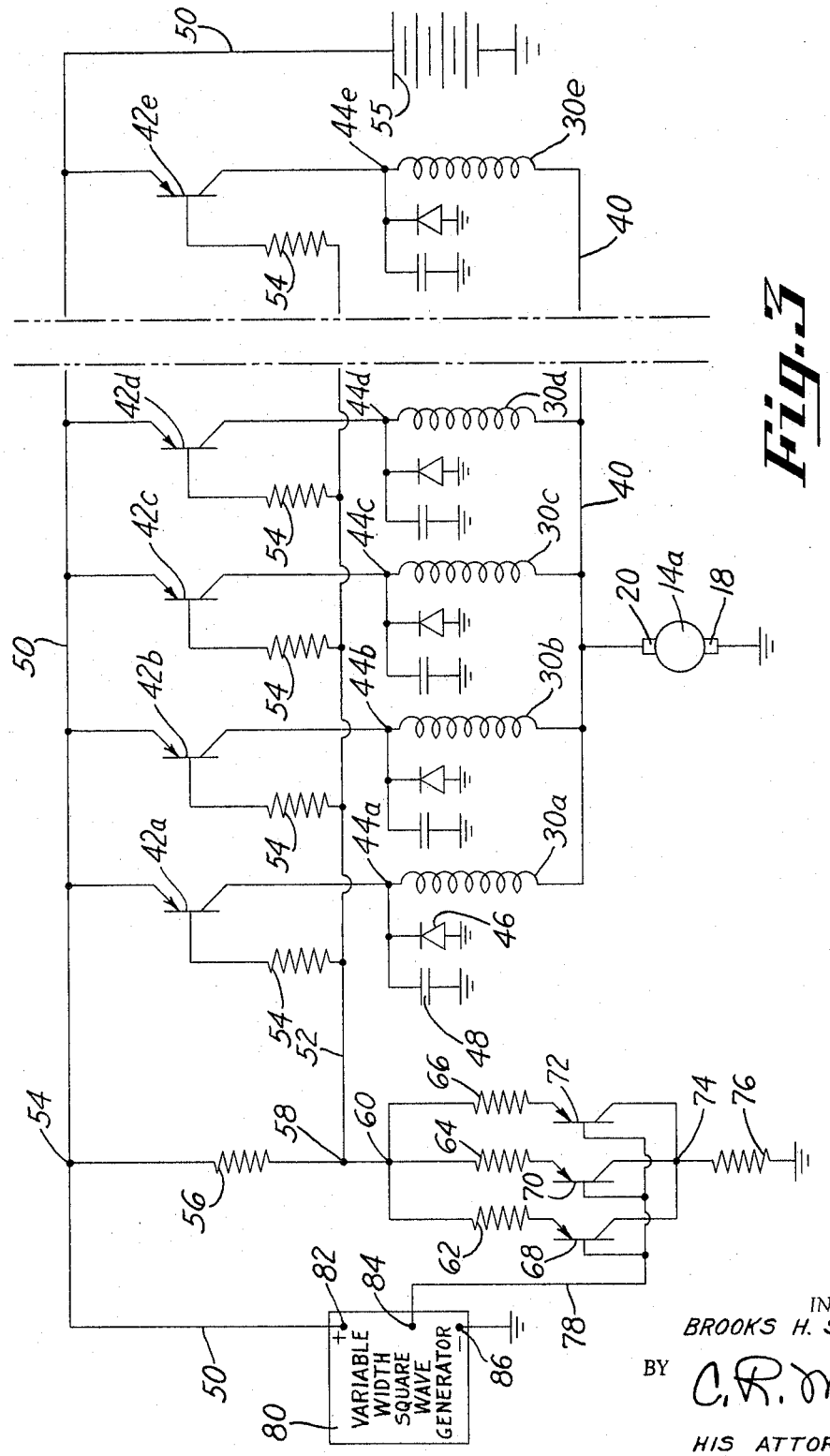

FIGURE 3 is a schematic circuit diagram of a motor control system made in accordance with this invention.
FIGURE 4 is a view of the curves of the output of the square wave generator which is used to control the conductivity of the transistors shown in the system of FIGURE 3.

Referring now to the drawings and more particularly to FIGURE 1, a series motor is illustrated which is controlled by the electrical system shown in FIGURE 3. The motor is generally designated by reference numeral 10 and includes the usual casing or housing 12. The casing or housing 12 rotatably supports an armature assembly 14 which includes a commutator 16. The armature 14 is journalled for rotation in bearings located in end frames which are not illustrated. The commutator 16 is engaged by brushes 18 and 20, the brush 18 being connected directly to ground.

The field winding conductor for the motor 10 is made up of a plurality of conductors and is designated in its entirety in FIGURE 1 by reference numeral 22. The field winding 22 is connected between the brush 20 and a multiple connector 24. It is seen that the field winding conductor 22 is wound around the pole shoes 26 and 28 which are secured to the housing or frame 12. By referring to FIGURE 2, it is seen that the field winding conductor 22 comprises a plurality of conductors 30 which are secured to sheets of insulating material 32, 34 and 36. It can be seen from FIGURE 2 that there are 27 conductors and these conductors are joined together at one end and are connected to receptacles in the connector block 24 at their opposite end. It is therefore apparent that the twenty-seven conductors are connected in parallel between the connector block 24 and the brush 20 and are located as is illustrated in the sectional view of FIGURE 2.

The conductors 30 can be secured to the sheets of insulation 32, 34 and 36 by bonding them to these sheets. The conductors 30 and the insulating sheets 32, 34 and 36 are enclosed by the insulating material 38. It can be seen that the circuit for the field winding of the series motor of FIGURE 1 is through all of the parallel conductors 30 and extends between the multiple receptacle 24 and the brush 20. The connection of these conductors 30 which form individual field windings is better illustrated in FIGURE 3.

Referring now more particularly to FIGURE 3, the reference numeral 14a designates the armature winding of the series motor. The brush 18 is connected directly to ground whereas the brush 20 is connected with a conductor 40. The conductor 40 is connected to one side of the individual field coils which are designated by reference numerals 30a, 30b, 30c, 30d and 30e. The individual field elements 30a through 30e correspond to the conductors 30 shown in FIGURE 2 and there will be 27 of these field elements. All of these field elements have not been illustrated in FIGURE 3 in order to simplify the disclosure of this invention and to avoid repetitious duplication.

The current flow through the field windings 30a through 30e is controlled by a plurality of parallel connected transistors. To this end, the transistors 42a, 42b, 42c, 42d and 42e are provided. The collector electrodes of the transistors are connected respectively with junctions 44a, 44b, 44c, 44d and 44e. It is seen that the individual field elements 30a through 30e are connected respectively with the junctions 44a through 44e. A diode 46 is connected between junction 44a and ground and this diode is paralleled by a capacitor 48. A diode and capacitor is also connected with each junction 44b through 44e and ground as is apparent from FIGURE 3.

The emitter electrodes of transistors 42a through 42e are all connected with a lead wire 50. The base electrodes of the parallel connected transistors are connected with a lead wire 52 through the resistors 54.

The lead wire 50 is connected to one side of a source of direct current power which in this case takes the form of a battery 55. The opposite side of the battery 55 is connected directly to ground as shown. The lead wire 50 is connected with a junction 54. A resistor 56 connects the junction 54 and junction 58. The junction 58 is connected with a junction 60 and this junction is connected in series with resistors 62, 64 and 66. The resistor 62 is connected with the emitter electrode of a transistor 68. In a similar fashion, the resistors 64 and 66 are connected with the emitter electrodes of transistors 70 and 72. The collector electrodes of transistors 68, 70 and 72 are connected with junction 74 and a resistor 76 connects the junction 74 with ground. The base electrodes of transistors 68, 70 and 72 are all connected with the lead wire 78.

The conductivity of the transistors 42a through 42e is controlled by a variable width square wave generator 80 which has terminals 82, 84 and 86. The terminal 82 is connected with the lead wire 50 whereas the terminal 86 is grounded. The terminal 84 is connected with the lead wire 78 and is therefore connected with the base electrodes of transistors 68, 70 and 72.

The square wave generator 80 may be of many types and is designed to provide voltages appearing between junctions 82 and 84 which have wave forms of the type illustrated in FIGURE 4. In FIGURE 4, the wave forms are curves of voltage versus time and it is seen that pulses of square wave voltage are provided. The width of the square wave can be infinitely varied between various values. The wave forms at the bottom of FIGURE 4 illustrate a condition where the width of the square waves is greater than those illustrated at the top side of FIGURE 4. This width can be further varied from practically zero voltage to a condition where there is very little or no space between the square wave pulses which would correspond to a condition of substantially straight line direct current voltage. This variable width square wave generator, as will become more readily apparent hereinafter, is used to control the on and off times of the transistors 42a through 42e to therefore vary the speed of the motor 10 over substantially an infinite range.

The square wave generator 80 in its simplest form could be a resistor connected with terminal 82 and tapped at terminal 84. The resistor would be connected with terminal 86 through an on-off switching means and a square wave voltage would then be developed across the resistor which would be variable in accordance with the open and closed time of the switching means. This square wave generator preferably includes a transistor multivibrator which has a square wave output of variable duration and may be of the type shown in copending application, Serial No. 168,964, now Patent No. 3,223,909, filed concurrently herewith and assigned to the assignee of this invention. The transistor multivibrator controls an amplifier section which in turn controls the amplifier section that is comprised of transistors 68, 70 and 72. It will be readily apparent to those skilled in the art, that other means may be used to generate square waves having a variable width.

It is seen from FIGURE 3 that current for the field winding segments 30a through 30e and for the armature 14 must pass through the emitter-collector circuits of the parallel connected transistors 42a through 42e. When the emitters of the parallel connected transistors 42a through 42e are positive with respect to their base electrodes, these transistors turn on to complete a circuit to the field winding segments. The base voltage of transistors 42a through 42e depends upon the voltage of junction 58. When transistors 68, 70 and 72 are conducting, the junction 58 will approach ground potential and therefore the transistors 42a through 42e will be turned on. In this condition of operation, the emitter-collector circuits of transistors 68, 70 and 72 form a path for base current for transistors 42a through 42e.

The conductivity of transistors 68, 70 and 72 depends upon the voltage impressed between the emitter and base electrodes of these transistors. When a square wave pulse of voltage appears between junctions 82 and 84, it is applied across the emitter and base electrodes of transistors 68, 70 and 72 to turn these transistors on.

In actual practice, the voltage applied between the emitter and base electrodes of transistors 68, 70 and 72 may be from another amplifier section which is connected with a transistor multivibrator.

It can be seen from the foregoing that the average amount of current flowing through field winding segments 30a through 30e is controlled by the amount of time that the transistors 42a through 42e are turned on in a given period of time. The time that the transistors 42a through 42e is turned on is controlled by the amplifier transistors 68, 70 and 72 which are in turn controlled by the variable width square wave generator 80. When the current is varied in the field winding segments 30a through 30e, the speed of rotation of the armature 14 of motor 10 is varied and this speed range undergoes an infinite variation since the width of the square wave pulses may be varied substantially infinitely.

In the system of FIGURE 3, the resistance of field elements 30a through 30e is used to balance the current carried by the parallel connected transistors. This resistance thus insures that the transistors will equally divide the total motor load current. By using the resistance of the field elements for this purpose there is no need to connect separate resistors in series with transistors 42a through 42e with a resultant power loss if such resistors were used.

The diodes 46 and capacitors 48 are used to suppress transient voltages and therefore protect both the field segments and the transistors.

While the embodiments of the present invention as herein disclosed, constitute a preferred form, it is to be understood that other forms might be adopted.

What is claimed is as follows:

1. An electrical system comprising, a source of voltage having terminals, a plurality of transistors each having an emitter electrode, a base electrode and a collector electrode, means connecting the emitter electrodes of said transistors together and to one terminal of said voltage source, an electrical load, means connecting a part of said electrical load between each collector electrode of each transistor and the other terminal of said voltage source, and means for varying the emitter-base voltage of said transistors simultaneously.

2. An electrical system for supplying an electrical load through parallel connected transistors comprising, a plurality of transistors each having emitter, base and collector electrodes, a source of voltage, means connecting the emitter electrodes of said transistors directly to one side of said source of voltage, an electrical load comprised of a plurality of individual load segments, means connecting a respective load segment between a respective collector electrode of each of said transistors and an opposite side of said voltage source and means for varying the emitter-base voltage of said transistors simultaneously whereby all of said transistors are either fully conductive or fully nonconductive at the same time.

3. A motor control system for a series motor comprising, a motor having a plurality of field elements forming a complete field winding, a transistor connected in series with each of said field elements, and means for biasing all of said transistors to a substantially fully conductive or fully nonconductive condition simultaneously.

4. A motor control system comprising, a series motor having a plurality of field elements forming a total field winding, an armature winding, said field elements being connected together and to one side of said armature winding, a source of voltage, a transistor connected between an opposite side of each field element and said source of voltage, and means for controlling the conductivity of all the transistors simultaneously.

5. A motor control system for a series motor comprising, a motor having a plurality of individual field elements forming a field winding, said motor having an armature winding, means connecting one side of said armature winding with one side of all of said field elements, a source of voltage, a transistor connected between an opposite side of each of said field elements and said source of voltage for controlling the current flow through said field elements, and pulse wave generating means for controlling the conductivity of all of said transistors simultaneously.

6. An electrical circuit which is capable of substantially balancing the current carried by a plurality of parallel connected transistors without the use of balancing resistors comprising, a source of voltage, a plurality of transistors, an electrical load comprised of a plurality of load segments, means connecting individual transistors and load segments in parallel with each other and across said source of voltage whereby said transistors share the current supplied to said electrical load when said transistors are conductive, said load segments tending to cause a balance of current flow through said parallel connected transistors while serving as the electrical load for the system, and means for controlling the conductivity of all of said transistors simultaneously whereby said transistors under one condition of operation are all conductive at the same time.

7. The electrical system according to claim 6 wherein the load is an inductive load and wherein the load segments are inductive parts of the total inductive load.

8. The electrical system according to claim 6 wherein the electrical load is a field winding of a dynamoelectric machine and wherein the load segments when taken as a whole form the entire field winding for the dynamoelectric machine.

9. A motor control system for a series motor comprising, a motor having an armature winding and a plurality of field elements forming a field winding, means connecting one side of said field elements together and to one side of said armature winding, a transistor connected with an opposite side of each of said field elements, each transistor and field element being connected in parallel with each other, and means for biasing said transistors simultaneously to a conductive condition.

10. An electrical system comprising, a source of voltage, an inductive load comprised of a plurality of separate inductive elements, a plurality of parallel connected transistors connected between said voltage source and said inductive load, each transistor being connected in series with a respective inductive element, and means for biasing all of said transistors simultaneously to a conductive condition, said separate inductive elements serving to equalize current flow through said transistors as well as forming the electrical load for said system.

References Cited by the Examiner
UNITED STATES PATENTS

| | | | |
|---|---|---|---|
| 1,251,688 | 1/1918 | Peck et al. | 318—353 |
| 1,973,547 | 9/1934 | Stohr | 318—138 |
| 2,923,873 | 2/1960 | Annis | 318—353 |
| 2,980,839 | 4/1961 | Haeussermann | 318—254 |
| 3,035,217 | 5/1962 | Bertrand | 318—353 X |
| 3,064,175 | 11/1962 | Vergez | 317—148.5 |

OTHER REFERENCES

Publication: Motorola Power Transistor Handbook, 1960, TK 7872.T73 M6 pp. 141–142.

ORIS L. RADER, *Primary Examiner.*

JOHN F. COUCH, *Examiner.*

S. GORDON, J. C. BERENZWEIG, *Assistant Examiners.*